Sept. 27, 1949.   F. URBACH   2,482,813
PHOTORECORDING
Filed March 26, 1946
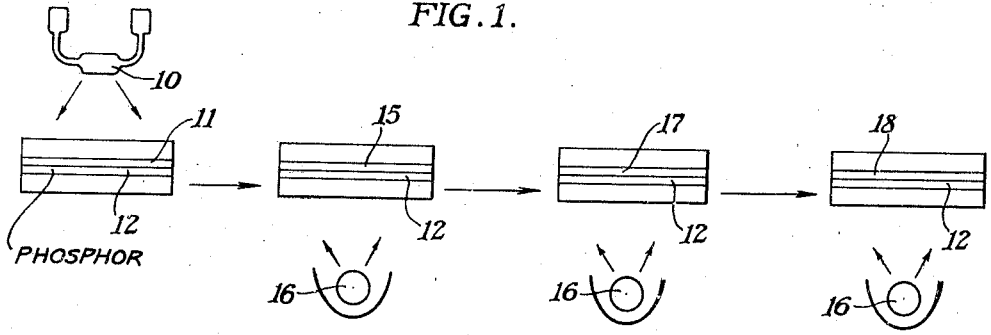
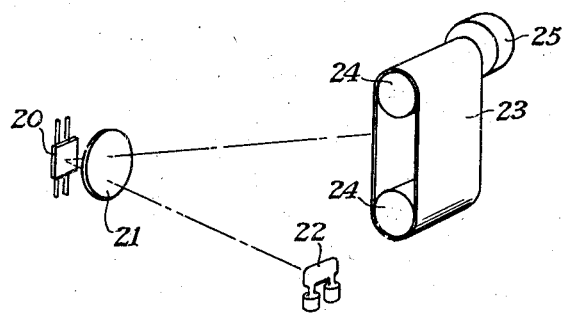
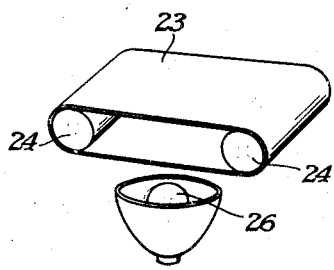
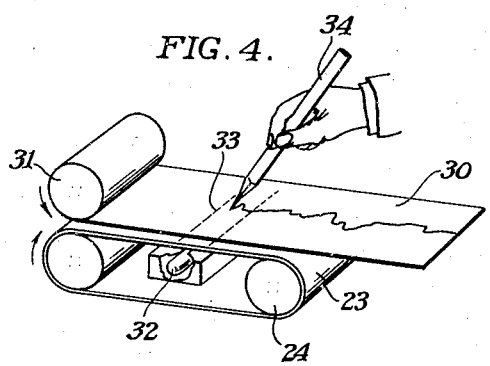
FRANZ URBACH
INVENTOR
BY
ATTY & AG'T Patented Sept. 27, 1949

2,482,813

UNITED STATES PATENT OFFICE 2,482,813

PHOTORECORDING

Franz Urbach, Rochester, N. Y., assignor to Eastman Kodak Company, Rochester, N. Y., a corporation of New Jersey Application March 26, 1946, Serial No. 657,135

1 Claim. (Cl. 250—65)

This invention relates to photorecording and has for its main object the provision of a method of delayed action photorecording.

The term photorecording is here used to refer to the recording of light, usually photographic, but in some cases the final step may be actually a manual one. The process here described should be compared to that described in my Serial Number 657,136 filed concurrently herewith the two processes having slightly different advantages for different purposes. Reference is also made to my concurrently filed application Serial No. 657,137 having to do with a third system of photography particularly for infra red photography, by using phosphors of the same type as used in the present invention. The infra red photography case is limited in its utility to relatively long wavelength infra red light because at shorter wavelengths, photographic emulsions can be directly sensitized. However the present invention has advantages which make it useful in the visible as well as in the infra red region.

The object of the present invention is to provide a method of photorecording permitting delay between the exposure to the light and the preparation of the final record, permitting secondly the preparation of the final record by relatively simple means and permitting thirdly the selection of one of the exposures to be recorded. That is, a latent record is made and then brought out as visible light to give an image which may be completed manually or photographically or which may be obliterated if not wanted and in this case the material could be used over again.

The present invention employs phosphorescent layers which can be excited by ultraviolet light but which upon excitation do not emit an appreciable amount of the image received until stimulated preferably by infra red or red light. Although the longer wavelength stimulation is preferable, it should be noted that stimulation even with shorter wavelengths is feasible for the present purpose, if care is taken that the stimulating light is excluded from the recording emulsion or the observer's eye. According to the invention an ultraviolet image which is to be recorded is focused on such a phosphor thus exciting the phosphor in proportion (not necessarily a linear one) to the ultraviolet image. This "latent luminous image" may then be stored or it may be placed immediately in printing relation to the recording layer such as a photographic layer. The phosphor layer is then stimulated by being illuminated with stimulating light e. g. red or infra red light to which it is sensitive, causing the phosphor layer to emit blue or green light for example, with the distribution of the latent luminous image therein. This blue or green image is then permanently recorded on the recording layer, in the case of a photographic layer by development. Where only a simple line image such as the tracing of a galvanometer is to be recorded, the recording layer can be tracing paper or the like, and the phosphor layer is then illuminated with infra red light over one area at a time and the permanent record is made by tracing.

When the permanent record is to be made photographically, the photosensitive layer is placed in contact or other printing relation with the phosphor layer which is then uniformly illuminated with stimulating light. During successive printings the intensity of the infra red light is preferably increased so as to give constant exposure. It is possible thus to get several prints from the phosphorescent image, which is a positive with respect to the original image and thus the prints are negative with respect to the original image.

The stimulation or the exhausting which is here described with reference to red or infra red illumination may with most phosphors (and perhaps with some advantages) be done by heating the phosphor layer. Stimulation thus includes both direct heating and radiation, but the radiation procedures are by far the most practical.

The following examples are given of the composition of infra red sensitive phosphors which are particularly useful in the present invention. There are others which will work, but perhaps not as well as those here listed. As pointed out in my copending applications relative to the preparation and composition of phosphors themselves, each phosphor must include a base, a so-called flux and at least one activator. The flux is used, as usual, in quantities of a few percent during firing. The concentrations of the activators appear in parts per million by weight relative to the whole phosphor before firing. The exact values depend on the specific details of the preparation and the quantities may be varied from those given without materially affecting their use for the present invention. The preparation of these phosphors follows the conventional methods used in preparing ordinary phosphors, it being noted that the sensitivity depends on the degree of oxidation of the sulfides and selenides.

Since in this particular invention the only advantage in using the infra red is to prevent the stimulating light from affecting the emulsion or the observer's eye, the following list is only partial compared to that given in my above mentioned application No. 657,137 omitting those used at low temperatures. Such phosphors could be used if necessary however.

|   | Base | Flux | Activators |
|---|---|---|---|
| 1 | SrS | CaF₂ | Eu 100 Sm 100 |
| 2 | ---do--- | LiF | Ce 100 Sm 40 |
| 3 | ---do--- | ---do--- | Cu 100 Sm 20 |
| 4 | ---do--- | ---do--- | Ce 100 Sn 10,000 |
| 5 | ---do--- | ---do--- | Cu 100 Bi 100 |
| 6 | ZnS | NaCl | Mn 200 Cu 1 |
| 7 | ---do--- | ---do--- | Pb 40,000 Cu 1 |
| 8 | ---do--- | ---do--- | Pb 40,000 Cu 20 |
| 9 | SrSe-SrSO₃ | CaF₂ | Eu 100 Sm 100 |
| 10 | ---do--- | ---do--- | Eu 100 Bi 100 |

Some of these particular phosphors were developed by me as indicated by my copending application Serial Number 667,013 filed May 31, 1946, as well as in the applications referred to above.

The manner in which the present invention may be performed will be fully understood from the following description when read in connection with the accompanying drawings in which:

Fig. 1 is a flow chart showing successive photographic prints made according to the present invention.

Fig. 2 is a schematic perspective view of an embodiment of the invention applied to recording galvanometer deflections.

Fig. 3 illustrates preparation of the phosphor for the exposing illustrated in Fig. 2.

Fig. 4 illustrates one method of making a permanent record from the galvanometer trace obtained from Fig. 2.

In Fig. 1 light from an ultraviolet lamp 10 passes through a positive record 11 to expose a phosphor material 12 which is in an unexcited or exhausted state or preferably is in a partly excited state by having been uniformly excited either partly or to a high degree and then partially exhausted by infra red flooding. This feature gives a very high degree of sensitivity. It should be noted that this exposure of the phosphor 12 to the record 11 may be either by transillumination as shown or by reflex copying with the light passing through the phosphor to the record 11 which may be a printed page for example. By this exposure, the phosphor 12 receives a latent luminous positive image in excitation which is faintly visible due to spontaneous afterglow but which can be brought out very brightly by illuminating with stimulating light. A photographic layer 15 is placed in contact with the phosphor layer 12 which is then flooded by infra red light by a lamp 16. The layer 15 is then processed to a negative relative to the image in the layer 12, and hence negative to the original record 11. Successive prints are made on photographic layers 17 and 18 by successive exposures as shown, the intensity of the infra red light 16 being increased at each step to maintain exposure time substantially constant.

One particularly useful embodiment of this invention is shown in Fig. 2 wherein a galvanometer mirror 20 is illuminated through a lens 21 by an ultraviolet source of light 22. The trace of the galvanometer spot is made on a continuously moving phosphor band 23 passing over rollers 24. If something goes wrong during an experiment, that is something wrong with the electrical part of some experiment so that no permanent record is desired, the latent image may be wiped off the phosphor 23 by flooding it with red or infra red light from a lamp 26 as shown in Fig. 13 and then the phosphor may be used over again. Also the very faint spontaneous afterglow may be used for examination purposes to decide whether the particular trace in question is worth recording.

If it is worth recording, this may be done photographically as illustrated in Fig. 1 or may be done directly onto tracing paper 30 from a roll 31 as shown in Fig. 4. That is, the phosphor 23 now excited with the trace as shown in Fig. 2 is passed over an infra red light 32 so that a small area as shown by broken lines 33 is stimulated and may be easily traced manually with a pencil 34. Only part of the phosphor 23 is illuminated at any one time so that the image does not become exhausted before the trace is completed.

Having thus described the preferred embodiment of my invention I wish to point out that it is not limited to these examples but is of the scope of the appended claim.

I claim:

The method of making a plurality of photographic records of an image which comprises impinging said image in short wavelength radiation on a layer of a phosphor material of the type which is excited by, and stores the energy of, said short wavelength and which will release part of the energy when stimulated by longer wavelength radiation to emit actinic radiation of intermediate wavelength, placing photosensitive layers sensitive to said actinic light, successively in contact with the phosphor layer, stimulating the latent luminous image for each successive layer to form thereon an image of said intermediate wavelength light, increasing the intensity of the stimulating for successive layers to counteract the falling off of stimulability with successive stimulations and processing the layers to photographic images.

FRANZ URBACH.

REFERENCES CITED

The following references are of record in the file of this patent:

UNITED STATES PATENTS

| Number | Name | Date |
|---|---|---|
| 1,565,256 | Christensen | Dec. 15, 1925 |
| 1,648,058 | Parker | Nov. 8, 1927 |
| 1,724,572 | Geisen | Aug. 13, 1929 |
| 2,074,226 | Kunz et al. | Mar. 16, 1937 |
| 2,203,352 | Goldmark | June 4, 1940 |
| 2,240,844 | Goggin et al. | May 6, 1941 |
| 2,327,826 | Sherwood | Aug. 24, 1943 |